(12) United States Patent
Qin et al.

(10) Patent No.: US 12,355,303 B2
(45) Date of Patent: Jul. 8, 2025

(54) PUMP AND ELECTRIC MOTOR STATOR THEREOF

(71) Applicant: JOHNSON ELECTRIC INTERNATIONAL AG, Murten (CH)

(72) Inventors: Ruifeng Qin, Hong Kong (CN); Yi Jing, Shenzhen (CN); Bensong Huang, Shenzhen (CN); Guoyuan Zou, Shenzhen (CN); Denie Zeng, Shenzhen (CN); Zhenzi Fang, Shenzhen (CN); Guanyin Liang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 335 days.

(21) Appl. No.: 17/808,782

(22) Filed: Jun. 24, 2022

(65) Prior Publication Data
US 2022/0320921 A1    Oct. 6, 2022

Related U.S. Application Data

(63) Continuation of application No. PCT/CN2020/138036, filed on Dec. 21, 2020.

(30) Foreign Application Priority Data

Dec. 24, 2019    (CN) .......................... 201911346766.4

(51) Int. Cl.
*H02K 1/18*    (2006.01)
*H02K 3/52*    (2006.01)
*H02K 7/14*    (2006.01)
*H02K 15/022*    (2025.01)

(52) U.S. Cl.
CPC ............. *H02K 1/185* (2013.01); *H02K 3/522* (2013.01); *H02K 7/14* (2013.01); *H02K 15/022* (2013.01); *H02K 2203/12* (2013.01)

(58) Field of Classification Search
CPC ............................ H02K 5/26; H02K 2203/12
See application file for complete search history.

(56) References Cited

U.S. PATENT DOCUMENTS

| | | |
|---|---|---|
| 3,853,429 A | 12/1974 | Eheim |
| 2004/0119348 A1 | 6/2004 | Chang et al. |
| 2007/0241643 A1 | 10/2007 | Watanabe et al. |
| 2014/0346921 A1 | 11/2014 | Muschelknautz et al. |

(Continued)

FOREIGN PATENT DOCUMENTS

| | | | |
|---|---|---|---|
| CN | 102403828 A | | 4/2012 |
| CN | 202435221 U | * | 9/2012 |

(Continued)

OTHER PUBLICATIONS

Machine translation of CN-202435221-U (Year: 2012).*

(Continued)

*Primary Examiner* — Tulsidas C Patel
*Assistant Examiner* — Minki Chang
(74) *Attorney, Agent, or Firm* — Aird & McBurney LP (57) ABSTRACT a stator core, a bobbin fixed on the stator core, and a plurality of windings wound on the bobbin, characterized in that the stator further comprises an elastic member with one end fixed onto the insulating frame, the other end of the elastic member is resisted against and thereby forcing the bobbin to axially position the stator.

9 Claims, 9 Drawing Sheets

(56) References Cited

U.S. PATENT DOCUMENTS

2017/0342987 A1    11/2017  Li et al.
2019/0186571 A1*  6/2019  Takahashi .................. F16F 1/12

FOREIGN PATENT DOCUMENTS

| CN | 204271787 U | 4/2015 |
|----|-------------|--------|
| CN | 107425643 A | 12/2017 |
| CN | 109327114 A | 2/2019 |
| CN | 208797690 U | 4/2019 |
| CN | 209329797 U | 8/2019 |

OTHER PUBLICATIONS

English translation of International Search Report from corresponding PCT application No. PCT/CN2020/138036 Mar. 24, 2021.

* cited by examiner

PUMP AND ELECTRIC MOTOR STATOR THEREOF

CROSS REFERENCE TO RELATED APPLICATIONS

This non-provisional patent application is continuation application of PCT Application No. PCT/CN2020/138036, filed with the Chinese Patent Office on Dec. 21, 2020, which claims priority to Chinese Patent Application No. 201911346766.4, filed on Dec. 24, 2019, all of which are incorporated herein by reference in their entirety.

FIELD OF THE INVENTION

The invention relates to the field of electric technology, in particular to a pump and its motor stator.

BACKGROUND

An electric pump is a machine that conveys or pressurizes fluid, and usually includes a rotatable rotor, a stator fixed in a housing, and a printed circuit board electrically connected to the stator. In operation of the electric pump, alternating electromagnetic fields cause the stator to be subjected to alternating loads, which can cause vibration if the stator is not sufficiently fixed, resulting in increased noise. Furthermore, the vibration tends to make electronic components such as the printed circuit board to loosen or even fall off. The stator of the motor is usually fixed on the housing by the cooperative connection of bolts and a plurality of coil springs. However, this fixing method leads to problems such as high cost and easy loosening or falling off of the coil springs.

SUMMARY OF THE INVENTION

The present invention aims to provide a pump and a stator of a motor for the pump that can solve or at least alleviate the above-mentioned problems.

A stator core, a bobbin fixed on the stator core, and a plurality of windings wound on the bobbin, characterized in that the stator further comprises an elastic member with one end fixed onto the insulating frame, the other end of the elastic member is resisted against and thereby forcing the bobbin to axially position the stator.

Preferably, the elastic member is annular and forms undulations in the axial direction and comprises a plurality of sinking segments and rising segments alternately arranged in a circumferential direction, and the sinking segments are fixed onto the bobbin, the rising segment extends upwards beyond a top end of the bobbin and is axially forced towards the insulating bobbin.

Preferably, the elastic member has a break at one of the sinking segments and two fixing ends formed at opposite sides of the break. The two fixing ends extend from the corresponding one sinking segment and are embedded in the bobbin.

Preferably, the bobbin comprises a plurality of inner stop tabs arranged at intervals in the circumferential direction, a first lug and at least one second lug respectively are formed on different outer stop tabs respectively, the sum of the numbers of all the first fixing portion and the second fixing portion is equal to the number of the sinking segment.

Preferably, the two fixing ends and the sinking segment connected with fixing ends are embedded in the first lug.

Preferably, the elastic member comprises at least two sinking segments and two rising segments.

Preferably, the elastic member is integrally fixed onto the bobbin by means of insert molding.

A pump, comprising a casing, a motor and an impeller disposed in the casing, the motor comprising a stator described above and a rotor, the impeller is connected to the rotor.

Preferably, the pump further comprising a sleeve fixed to the casing, the sleeve comprising a main body and a surrounding wall surrounding the main body, the stator is sleeved on the periphery of the body portion, the surrounding wall is connected to the main body through a connecting portion.

Preferably, the elastic member of the stator resists against the connecting portion.

Preferably, a plurality rib is provided on the side of the connecting portion facing the stator, the elastic member resists against the ribs.

Preferably, the ribs extend radially on the connecting portion.

DETAILED DESCRIPTION OF THE PREFERRED EMBODIMENTS

The present invention will be further described below based on the drawings and the embodiments.

Figure 1:
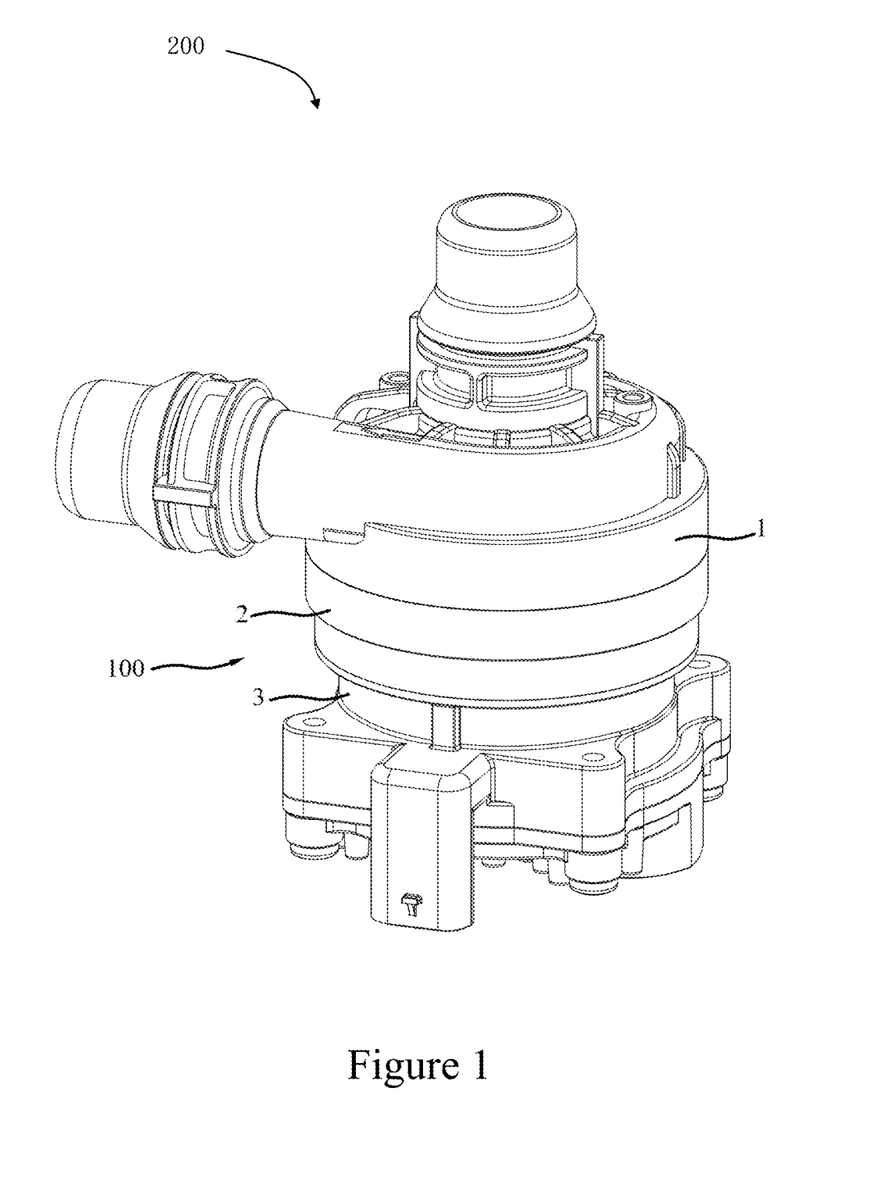
FIG. 1 is a perspective assembly view of an electric pump according to an embodiment of the present invention.
Figure 2:
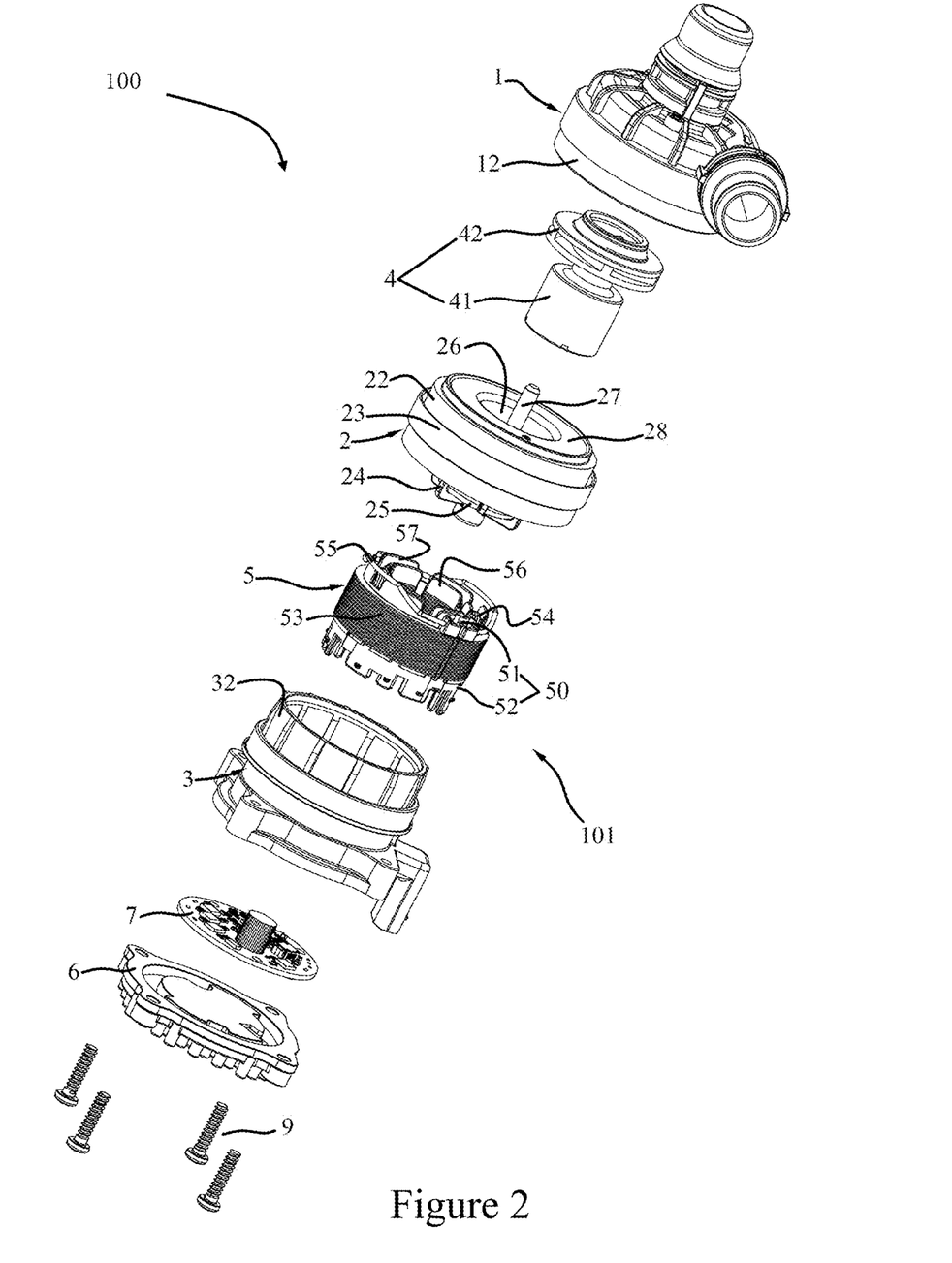
FIG. 2 is an exploded view of the electric pump shown in FIG. 1.
Figure 3:
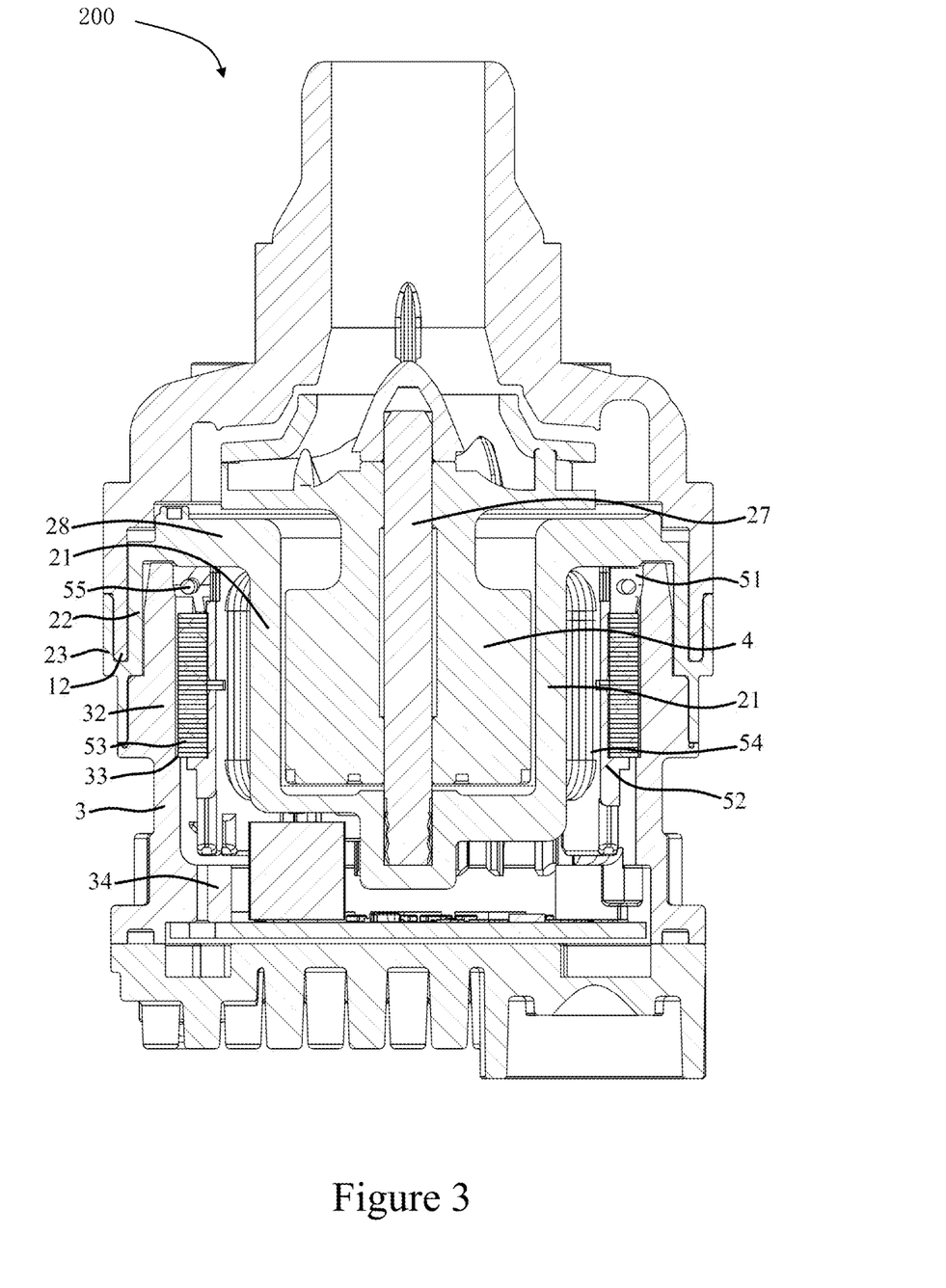
FIG. 3 is a longitudinal section-view of the electric liquid pump shown in FIG. 1.

Referring to FIGS. 1 to 3, a pump 200 according to an embodiment of the present invention includes a casing 100, a motor 101 and an impeller 42 disposed in the casing 100. The casing 100 includes an upper case 1 and a lower case 3 which are connected to each other. and a sleeve 2 fixedly mounted in the lower case 3. The motor 101 includes a stator 5 and a rotor 4. The rotor 4 is accommodated in the sleeve 2, and the stator 5 is arranged in an accommodating space formed between the sleeve 2 and the casing 100. A support shaft 27 is fixed in the sleeve 2, preferably by means of insert molding. The rotor 4 is rotatably supported in the sleeve 2 by the support shaft 27. The impeller 42 is connected to the rotor 4. In this embodiment, the impeller 42 and the rotor 4 are formed in one piece. In an alternative embodiment, the impeller 42 is detachably connected to the rotor 4.

The sleeve 2 includes a main body 21 and a surrounding wall 22 connected to one end of the main body 21. The main body 21 is a cylindrical structure with an open end close to the upper case 1 and a closed end opposed to the opened end.

The surrounding wall 22 is annular to surround the main body 21 and be spaced therefrom. One of opposite ends of the surrounding wall 22 is connected to the open end of the main body 21 through a connecting portion 28, and the other end extends toward the closed end of the main body 21. In this embodiment, an outer side of the surrounding wall 22 has an outer ring 23 surrounding and spaced from the surrounding wall 22.

In this embodiment, the upper case 1 has an open end 12 facing the lower case 3. The open end 12 of the upper case 1 can be engaged between the outer ring 23 and the surrounding wall 22. The lower case 3 has an open end 32 facing the upper case 1. An end cap 6 with a circuit board 7 is mounted on one end of the lower case 3 away from the open end 32 through a plurality of connectors 9. The open end 32 of the lower case 31 is engaged with the surrounding wall 22 of the sleeve 2. In one embodiment, the open end 32 of the lower case 31 abuts against an inner side of the surrounding wall 22. The stator 5 is accommodated in the accommodating space formed between the sleeve 2 and the lower casing 3, and the rotor 4 and the impeller 42 are accommodated in a space bounded by the sleeve 2 and the upper casing 1.

The inside of the main body 21 of the sleeve 2 defines an inner cavity 26 for accommodating the rotor 4. The rotor 4 is rotatably supported in the inner cavity 26 by a support shaft 27. In one embodiment, the support shaft 27 is fixed to the closed end 25 of the main body 21 by means of insert molding. The stator 5 is attached to the inner wall of the lower casing 3 and sleeved on the main body 21 of the sleeve 2. In one embodiment, the stator 5 is arranged in the accommodating space formed by the sleeve 2 and the lower case 3 by means of axial press fitting. One axial end of the stator 5 abuts against the connecting portion 28 of the sleeve 2, and the other axial end abuts against the lower casing, thereby preventing the stator 5 from loosening due to vibration.

Figure 4:
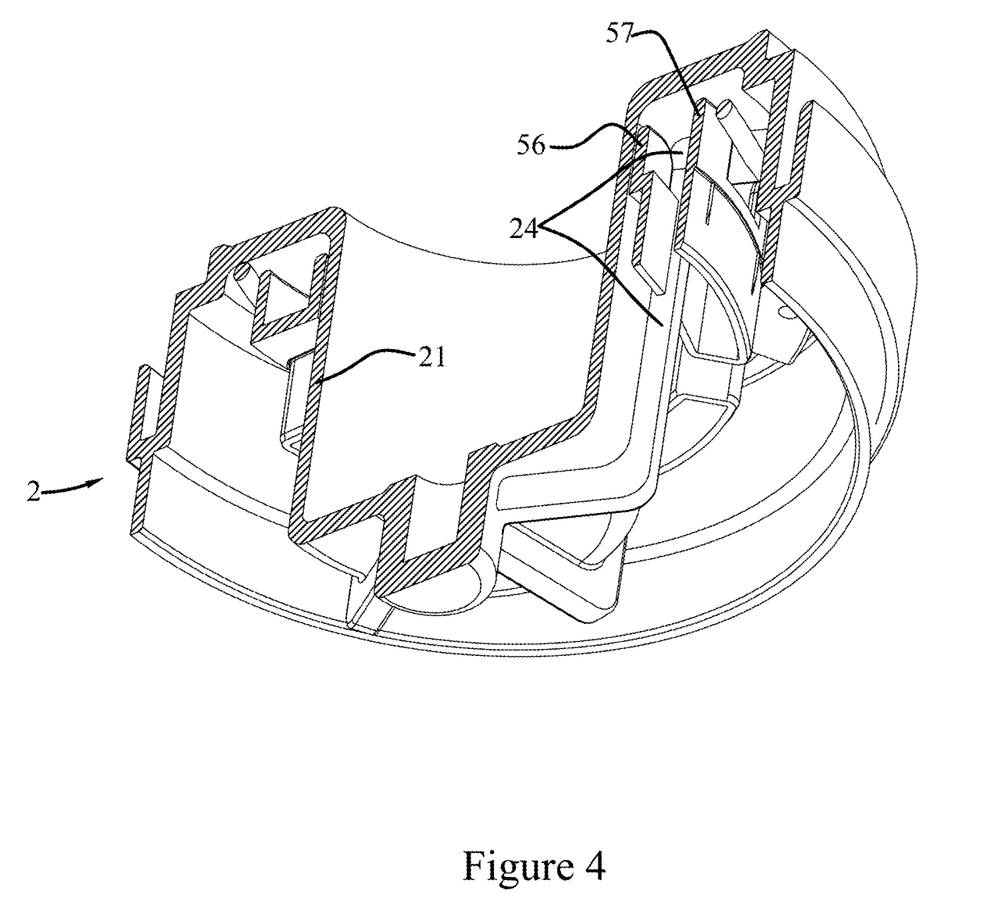
FIG. 4 is a cut-off view of the electric pump of FIG. 1, showing a stator mounted in a sleeve.

In one embodiment, the stator 5 includes a stator core 53, a bobbin 50 fixed on the stator core 53, a plurality of windings 54 wound on the bobbin 50, and an elastic member 55 mounted on the bobbin 50. The bobbin 50 includes a plurality of inner stop tabs 56 and a corresponding number of outer stop tabs 57 to position the windings 54. Referring also to FIG. 4, in assembly, the inner stop tabs 56 abut against the main body 21 of the sleeve 2. A plurality of ribs 24 is formed on the outer side of the body portion 21 to prevent the circumferential movement of the stator 5. The ribs 24 extend axially along the body portion 21. In this embodiment, each of the inner stop tabs 56 is clamped between two adjacent ribs 24

Figure 5:
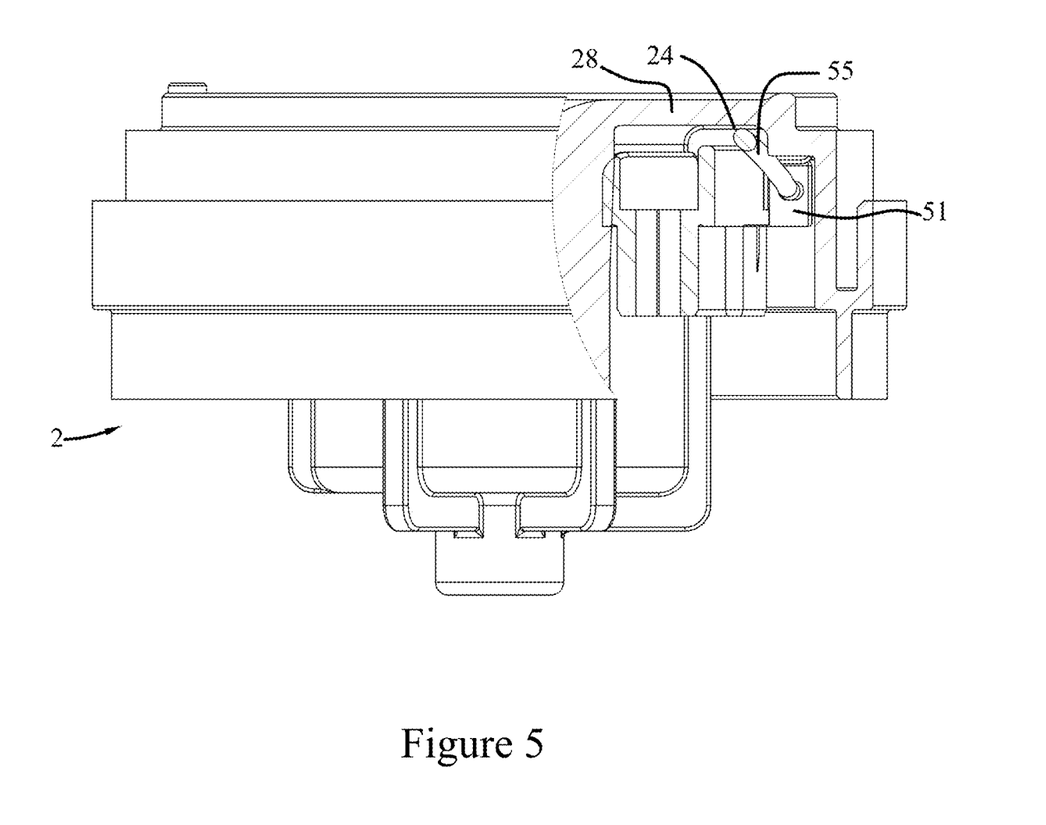
FIG. 5 is a partial section-view of the electric pump of FIG. 1. showing the stator mounted in the sleeve.

In one embodiment, the elastic member 55 is fixed onto the bobbin 50 by means of insert molding. Referring also to FIG. 5, the elastic member 55 is fixed at one end of the bobbin 50 adjacent to the connecting portion 28 of the sleeve 2. The connecting portion 28 resists against the elastic member 55, thereby pressing the bobbin 50 towards the closed end of the lower case 3. The lower case 3 is provided with a stop portion 33 extending radially inward from the inner side thereof. The stator core 53 tightly abuts against the stop portion 33 due to the action of the elastic member 55. In this embodiment, the ribs 24 also extend onto a side of the connecting portion 28 facing the closed end of the lower case 3. The elastic member 55 resists against the rib 24 arranged on the connecting portion 28. Preferably, the ribs 24 extend radially on the connecting portion 28. Optionally, the lower case 3 is provided with a step 34 extending radially inward from the inner side thereof to about against the other end of the bobbin 50, so that, the elastic member 55 enables the stator 5 to be positioned axially between the connecting portion 28 and step 34.

Figure 6:
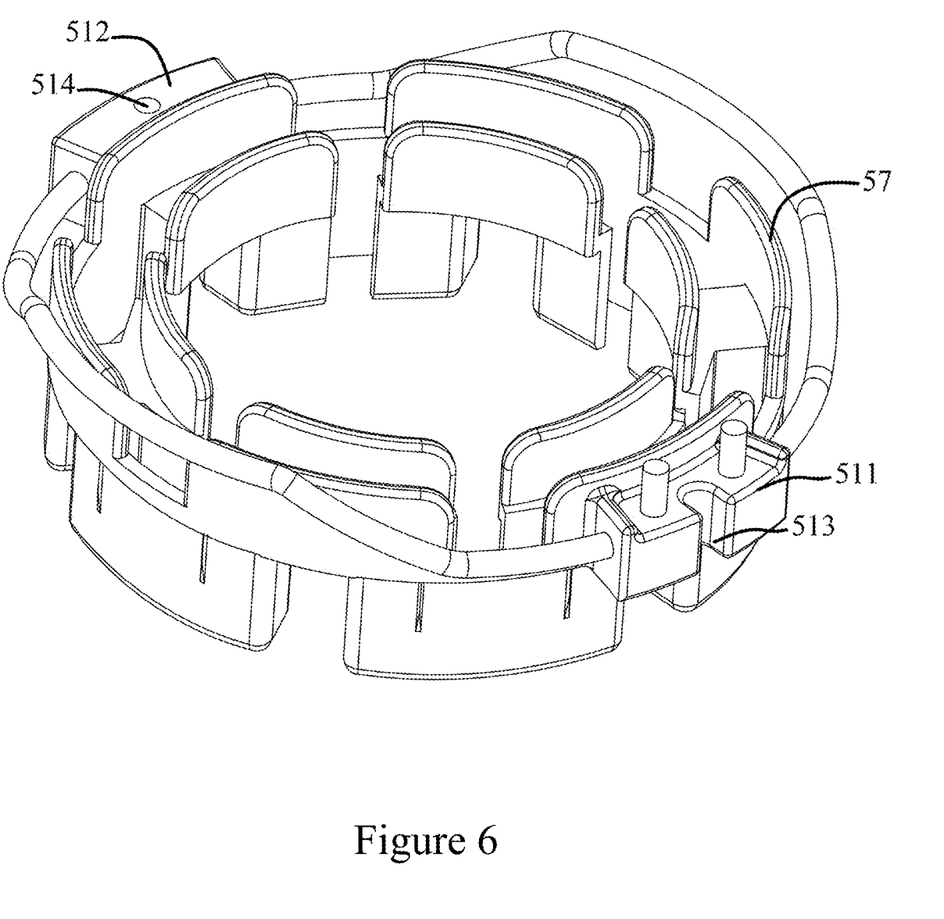
FIG. 6 is a perspective view of a bobbin integrated with an elastic member of the electric pump of FIG. 1.

In one embodiment, the bobbin 50 includes a first bracket 51 and a second bracket 52 arranged up and down. The first bracket 51 and the second bracket 52 are fixedly mounted onto opposite axial ends of the stator core 53. The elastic member 55 is fixed to the first bracket 51 by means of insert molding. Referring also to FIG. 6, the first bracket 51 is provided with a first lug 511 and a second lug 512. The outer stop tab 57 is provided on the first bracket 51. In one embodiment, the first lug 511 and the second lug 512 are formed on different outer stop tabs 57 respectively. In one embodiment, a notch 13 is defined in a radial outer side of the first lug 511 and axially extends therethrough. An axial through hole 514 is defined in the second fixing portion 512 for positioning the elastic member 55 during insert molding.

Figure 7:
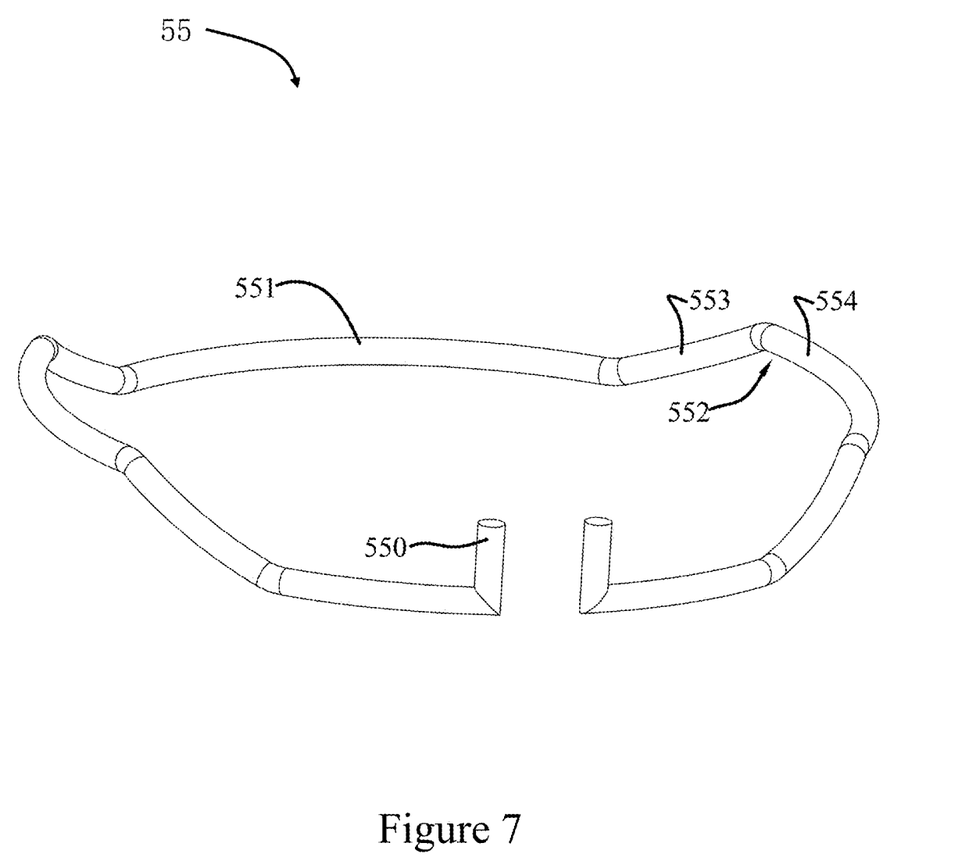
FIG. 7 is perspective view of the elastic member of FIG. 6.

Referring also to FIG. 7, the elastic member 55 is annular and forms undulations in the axial direction, that is, the entire elastic member 55 does not lies in one plane. The elastic member 55 includes a plurality of sinking segments 551 and rising segments 552. The sinking segments 551 and the rising segments 552 are alternately arranged in a circumferential direction. The sinking segments 551 are embedded in the bobbin 50. The rising segments 552 are configured to resist against the casing 100 or a component fixed to the casing 100 to prevent vibration of the stator 5. In one embodiment, the rising segments 552 resist against the connecting portion 28 of the sleeve 2 and thereby urging the stator 5 to the lower case 3. In one embodiment, the elastic member 55 is a bended a spring wire (e.g., spring steel wire). Preferably, the elastic member 55 has a break at one of the sinking segments 551 and two fixing ends 550 formed at opposite side of the break. In one embodiment, the two fixing ends 550 extend axially upward. Optionally, the fixing ends 550 can also extend radially outwards. The fixing ends 550 and the sinking segment 551 connected with fixing ends 550 are embedded in the first lug 511 of the first bracket 51. The fixing ends 550 enables the elastic member 55 to be stably fixed onto the bobbin 50. In an alternative embodiment, the elastic member 55 can also be a wave spring ring without the fixing ends 550.

The other sinking segment 551 of the elastic member 55 (except the sinking segment 551 embedded in the first lug 511) is fixed in the second lug 512 of the first bracket 51. In one embodiment, the elastic member 55 has two sinking segments 551 and two rising segments 552. Therefore, the first bracket 51 includes only one first lug 511 and one second lug 512. It can be understood that there must be at least two sinking segments 551 and two rising segments 552 avoid unbalanced force when the rising segments 552 resist against the connecting portion 28 of the sleeve 2.

Figure 8:
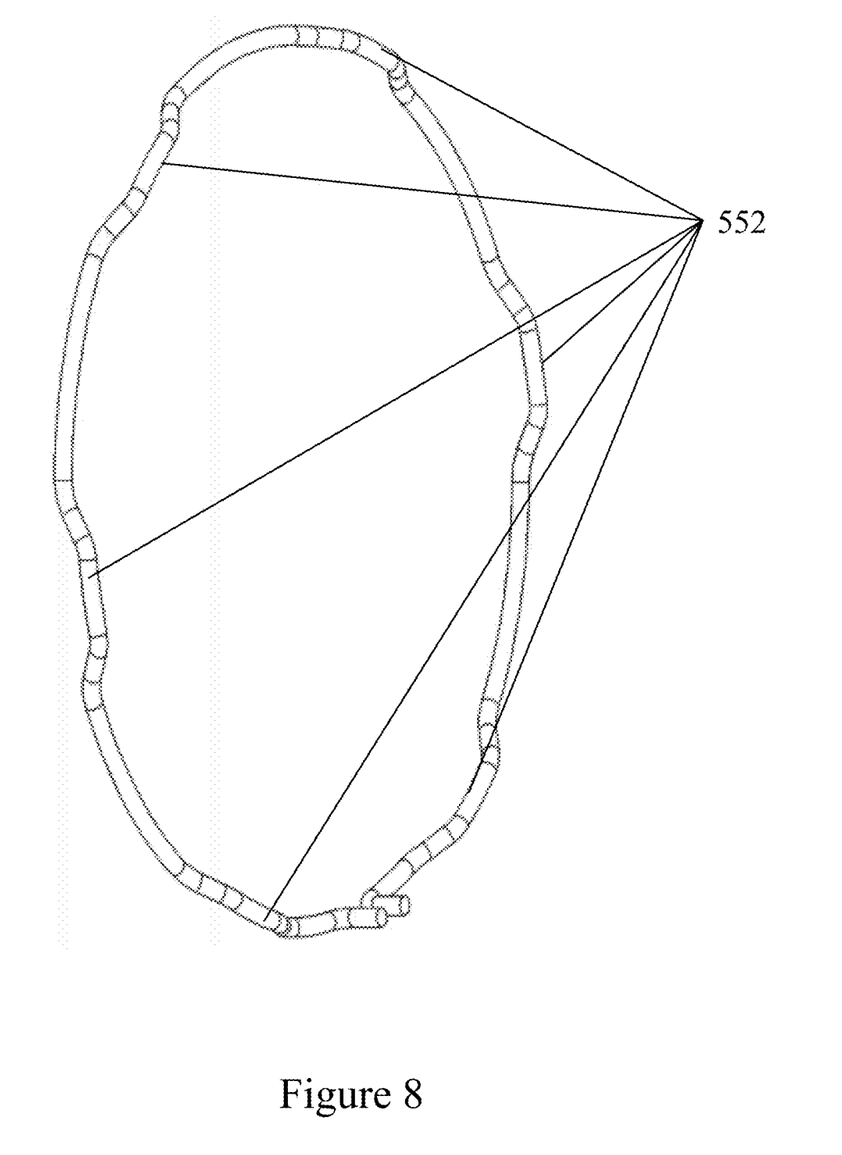
FIG. 8 is perspective view of the elastic member according to another embodiment of the present invention.
Figure 9:
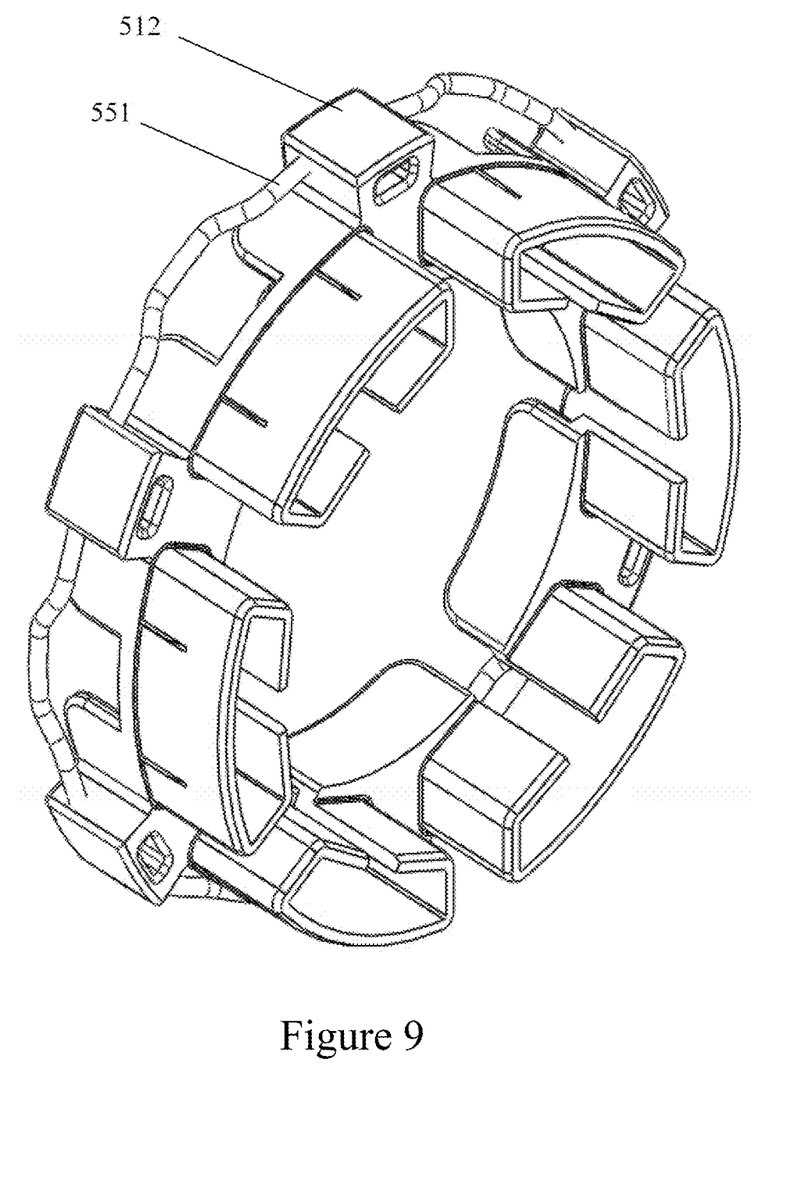
FIG. 9 is a perspective view of a bobbin integrated with an elastic member of FIG. 8

Referring to FIG. 8 and FIG. 9, the elastic member 55 of another embodiment of the present invention includes six sinking segments 551 and six rising segments 552. In the embodiments, the number of the sinking segments 551/the rising segments 552 of the elastic member 55 are equal to the outer stop tabs 57 of the bobbin 50. Alternatively, the sinking segments 551 and the rising segments 552 are symmetrically arranged. It is understood that the size and number of the sinking segments 551 and the rising segments 552 of the elastic member 55 can be adjusted based on different situation. In one embodiment, the rising segments 552 of the elastic member 55 resist against the rib 24 arranged on the connecting portion 28 of the sleeve 2.

As shown in FIG. 7, each of the rising segments 552 includes two inclined portions 553 respectively connected to the sinking segments 551 at opposite sides and a flat portion 554 located between the two inclined portions 553. The flat portion 554 is the highest portion of the rising segments 552 and is substantially parallel to the connecting portion 28, so as to better engage with the connecting portion 28 of the sleeve 2, i.e., to maximize the contact area with the connecting portion 28. The flat portion 554 extends upwards beyond a top end of the bobbin 50 in the axial direction. The elastic member 55 resists against the connecting portion 28 of the sleeve 2 through the flat portions 554 of the rising segments 552, thereby urging the stator 5 to the casing 3 to prevent the stator 5 from loosening or even falling off due to vibration.

Although certain inventive embodiments of the present disclosure have been specifically described, the present disclosure is not to be construed as being limited thereto. Various changes or modifications may be made to the present disclosure without departing from the scope and spirit of the present disclosure.

The invention claimed is:

1. A stator of motor for a pump, fixed in a casing and comprising:
   a stator core, a bobbin fixed on the stator core, and a plurality of windings wound on the bobbin, wherein the stator further comprises an elastic member with one end fixed onto the bobbin, the other end of the elastic member is resisted against and thereby forcing the bobbin to axially position the stator, the elastic member is integrally fixed onto the bobbin by means of insert molding;
   wherein the elastic member is annular and forms undulations in the axial direction and comprises a plurality of sinking segments and rising segments alternately arranged in a circumferential direction, and the sinking segments are fixed onto the bobbin, the rising segment extends upwards beyond a top end of the bobbin and is axially forced towards the bobbin;
   wherein the elastic member has a break at one of the sinking segments and two fixing ends formed at opposite sides of the break, the two fixing ends extend from the corresponding one sinking segment and are embedded in the bobbin.

2. The stator according to claim 1, wherein the bobbin comprises a plurality of inner stop tabs arranged at intervals in the circumferential direction, a first lug and at least one second lug are respectively formed on different outer stop tabs respectively, the sum of the numbers of all the first fixing portion and the second fixing portion is equal to the number of the sinking segment.

3. The stator according to claim 2, wherein the two fixing ends and the sinking segment connected with fixing ends are embedded in the first lug.

4. The stator according to claim 1, wherein the elastic member comprises at least two sinking segments and two rising segments.

5. A pump, comprising a casing, a motor and an impeller disposed in the casing, the motor comprising a stator fixed in the casing and a rotor connecting with the impeller, the stator comprising a stator core, a bobbin fixed on the stator core, and a plurality of windings wound on the bobbin, wherein the stator further comprises an elastic member with one end fixed onto the bobbin, the other end of the elastic member is resisted against and thereby forcing the bobbin to axially position the stator the elastic member is integrally fixed onto the bobbin by means of insert molding;
   wherein the elastic member is annular and forms undulations in the axial direction and comprises a plurality of sinking segments and rising segments alternately arranged in a circumferential direction, and the sinking segments are fixed onto the bobbin, the rising segment extends upwards beyond a top end of the bobbin and is axially forced towards the bobbin;
   wherein the elastic member has a break at one of the sinking segments and two fixing ends formed at opposite sides of the break, the two fixing ends extend from the corresponding one sinking segment and are embedded in the bobbin.

6. The pump according to claim 5, further comprising a sleeve fixed to the casing, the sleeve comprising a main body and a surrounding wall surrounding the main body, the stator is sleeved on the periphery of the main body, the surrounding wall is connected to the main body through a connecting portion.

7. The pump according to claim 6, wherein the elastic member of the stator resists against the connecting portion.

8. The pump according to claim 7, wherein a plurality of ribs is provided on the side of the connecting portion facing the stator, the elastic member resists against the ribs.

9. The pump according to claim 8, wherein the ribs extend radially on the connecting portion.

* * * * *